US012646880B2

(12) United States Patent
Wi et al.

(10) Patent No.: US 12,646,880 B2
(45) Date of Patent: Jun. 2, 2026

(54) TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Nungna Wi, Mie (JP); Teruo Hara, Mie (JP); Takae Imayoshi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 351 days.

(21) Appl. No.: 18/572,777

(22) PCT Filed: Jun. 15, 2022

(86) PCT No.: PCT/JP2022/023899
§ 371 (c)(1),
(2) Date: Dec. 20, 2023

(87) PCT Pub. No.: WO2023/276663
PCT Pub. Date: Jan. 5, 2023

(65) Prior Publication Data
US 2024/0297453 A1 Sep. 5, 2024

(30) Foreign Application Priority Data
Jul. 2, 2021 (JP) ................................ 2021-110965

(51) Int. Cl.
*H01R 13/11* (2006.01)

(52) U.S. Cl.
CPC .................................... *H01R 13/11* (2013.01)

(58) Field of Classification Search
CPC ...... H01R 13/11; H01R 13/113; H01R 13/114
(Continued)

(56) References Cited

U.S. PATENT DOCUMENTS

| | | | | |
|---|---|---|---|---|
| 5,630,738 A * | 5/1997 | Ito | H01R 13/113 | 439/852 |
| 6,945,830 B2 * | 9/2005 | Copper | H01R 13/057 | 439/852 |

(Continued)

FOREIGN PATENT DOCUMENTS

| | | |
|---|---|---|
| JP | 2006-080004 A | 3/2006 |
| JP | 2009-054504 A | 3/2009 |

(Continued)

OTHER PUBLICATIONS

International Search Report issued on Aug. 16, 2022 for WO 2023/276663 A1 (4 pages).

*Primary Examiner* — Gary F Paumen
(74) *Attorney, Agent, or Firm* — Venjuris, P.C.

(57) ABSTRACT

A rectangular tube portion includes a first wall provided with the resilient contact piece, a second wall provided with the receiving portion and a pair of side walls connecting both side edges of the first wall and both side edges of the second wall. At least one of the pair of side walls includes a resilient piece for suppressing a movement of the tab in the first direction by pressing a side edge of the tab inwardly of the recontact portion in the first direction. The resilient piece includes a contact portion disposed to face a side edge of the resilient contact piece in the first direction. A movement of a tip part of the resilient piece inwardly of the rectangular
(Continued)

tube portion in the first direction is suppressed by contact of the contact portion with the side edge of the resilient contact piece.

3 Claims, 12 Drawing Sheets

(58) Field of Classification Search
USPC .................................................. 439/816, 852
See application file for complete search history.

(56) References Cited

U.S. PATENT DOCUMENTS

| | | | | |
|---|---|---|---|---|
| 2012/0264340 | A1* | 10/2012 | Mueller ............... | H01R 13/114<br>439/861 |
| 2016/0072203 | A1 | 3/2016 | Il et al. | |
| 2021/0175653 | A1* | 6/2021 | Sugimoto ............ | H01R 13/533 |

FOREIGN PATENT DOCUMENTS

| | | | |
|---|---|---|---|
| JP | 2014-146459 | A | 8/2014 |
| WO | 2018/021057 | A1 | 2/2018 |

* cited by examiner

TERMINAL

CROSS REFERENCE TO RELATED APPLICATIONS

This application is a national phase of PCT application No. PCT/JP2022/023899, filed on 15 Jun. 2022, which claims priority from Japanese patent application No. 2021-110965, filed on 2 Jul. 2021, all of which are incorporated herein by reference.

TECHNICAL FIELD

The present disclosure relates to a terminal.

BACKGROUND

A terminal fitting used in an automotive vehicle or the like is conventionally known from Japanese Patent Laid-Open Publication No. 2006-080004 (Patent Document 1 below). This terminal fitting is provided with a rectangular tube portion, into which a tab of a mating terminal is inserted from front. A resilient contact piece is provided on a bottom plate of the rectangular tube portion, and a receiving portion projecting downward is provided on an upper plate of the rectangular tube portion. A pair of left and right side plates of the rectangular tube portion are formed with holding portions cantilevered forward and curved to bulge inwardly of the rectangular tube portion. The tab inserted into the rectangular tube portion is sandwiched in a thickness direction between the resilient contact piece and the receiving portion. A pair of left and right holding portions hold a tip part of the tab to prevent this tip part from being displaced in a lateral direction with respect to the rectangular tube portion by contacting the tab at a position closer to a tip than a contact portion with the resilient contact piece. Thus, abrasion between the tab and the rectangular tube portion and between the tab and the resilient contact piece can be suppressed. Therefore, the connection reliability of the terminal fitting and the mating terminal can be ensured also under a vibration environment such as an automotive vehicle.

PRIOR ART DOCUMENT

Patent Document

Patent Document 1: JP 2006-080004 A

SUMMARY OF THE INVENTION

Problems to be Solved

However, in the above configuration, the insertion of the mating terminal into the rectangular tube portion is possibly hindered by the holding portion being bent inwardly of the rectangular tube portion by an external force.

Means to Solve the Problem

The present disclosure is directed to a terminal with a rectangular tube portion, a tab of a mating terminal being inserted into the rectangular tube portion from front, a resilient contact piece provided in the rectangular tube portion, and a receiving portion provided in the rectangular tube portion, the receiving portion sandwiching the tab together with the resilient contact piece, the rectangular tube portion including a first wall provided with the resilient contact piece, a second wall provided with the receiving portion and a pair of side walls connecting both side edges of the first wall and both side edges of the second wall, a facing direction of the pair of side walls being a first direction, at least one of the pair of side walls including a resilient piece for suppressing a movement of the tab in the first direction by pressing a side edge of the tab inwardly of the recontact portion in the first direction, the resilient piece including a contact portion disposed to face a side edge of the resilient contact piece in the first direction, and a movement of a tip part of the resilient piece inwardly of the rectangular tube portion in the first direction being suppressed by contact of the contact portion with the side edge of the resilient contact piece.

Effect of the Invention

According to the present disclosure, it is possible to provide a terminal capable of making it difficult to hinder the insertion of a mating terminal into a rectangular tube portion and ensuring connection reliability to the mating terminal under a vibration environment.

DETAILED DESCRIPTION TO EXECUTE THE INVENTION

Description of Embodiments of Present Disclosure

Figure 1:
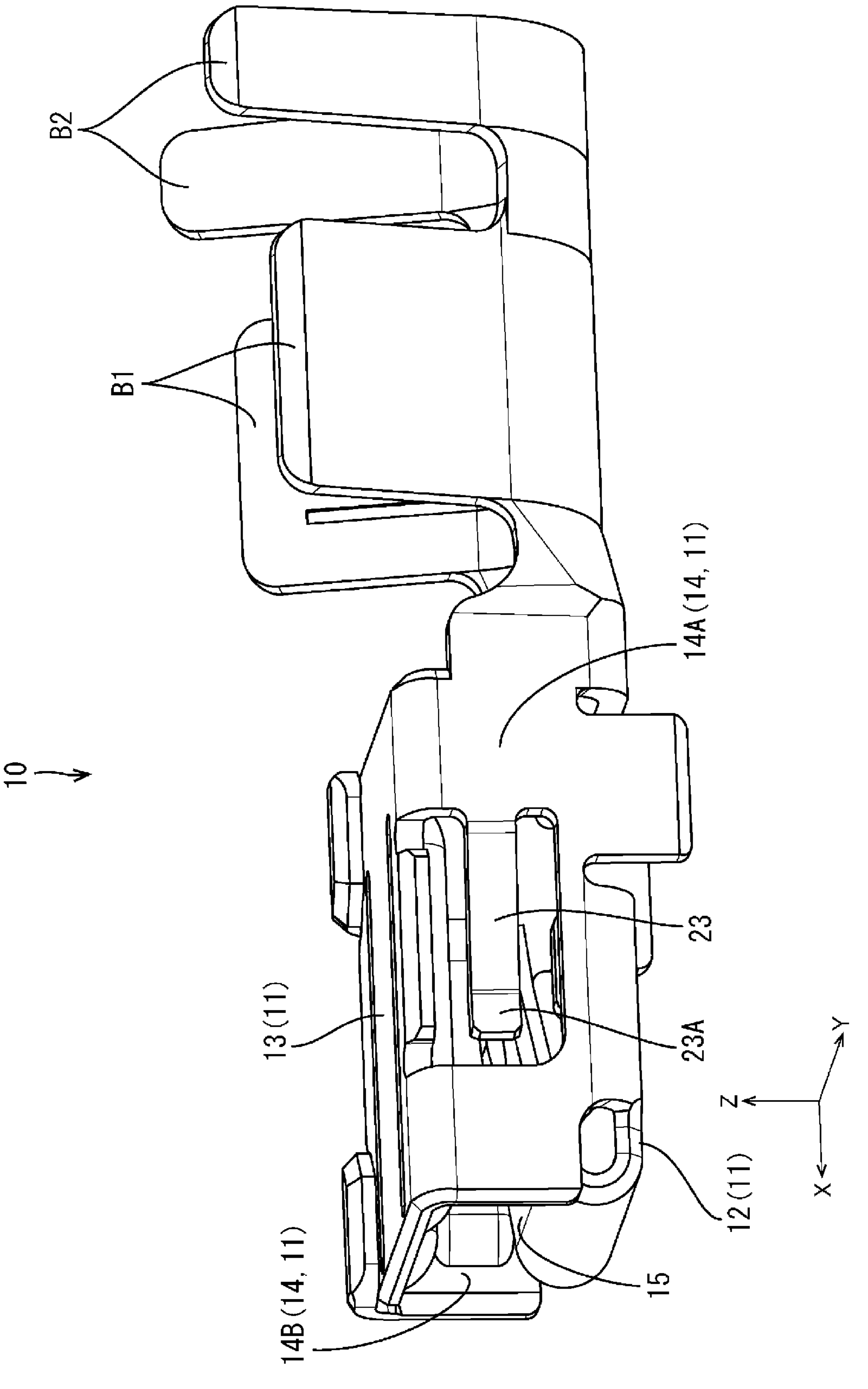
FIG. 1 is a perspective view of a terminal according to a first embodiment.

First, embodiments of the present disclosure are listed and described.

(1) The terminal of the present disclosure is provided with a rectangular tube portion, a tab of a mating terminal being inserted into the rectangular tube portion from front, a resilient contact piece provided in the rectangular tube portion, and a receiving portion provided in the rectangular tube portion, the receiving portion sandwiching the tab together with the resilient contact piece, the rectangular tube portion including a first wall provided with the resilient contact piece, a second wall provided with the receiving portion and a pair of side walls connecting both side edges of the first wall and both side edges of the second wall, a facing direction of the pair of side walls being a first direction, at least one of the pair of side walls including a resilient piece for suppressing a movement of the tab in the first direction by pressing a side edge of the tab inwardly of the recontact portion in the first direction, the resilient piece including a contact portion disposed to face a side edge of the resilient contact piece in the first direction, and a movement of a tip part of the resilient piece inwardly of the rectangular tube portion in the first direction being suppressed by contact of the contact portion with the side edge of the resilient contact piece.

According to this configuration, since a movement of the tab in the first direction is suppressed by the resilient piece, the abrasion of the tab, the resilient contact piece and the receiving portion is suppressed also under a vibration environment and the connection reliability of the terminal and the mating terminal can be ensured. Since a movement of the tip part of the resilient piece inwardly of the rectangular portion in the first direction can be suppressed by the contact of the contact portion of the resilient piece with the side edge of the resilient contact piece, the insertion of the mating terminal into the rectangular portion is hardly hindered.

(2) Preferably, the resilient piece includes a body portion long in a front-rear direction and an extending portion extending toward the first wall from a tip part of the body portion, and the extending portion includes the contact portion.

According to this configuration, a contact part of the contact portion and the side edge of the resilient contact piece is easily enlarged. Thus, a movement of the tip part of the resilient piece inwardly of the rectangular tube portion can be further suppressed.

(3) Preferably, a contact point portion having a spherical shape, projecting toward the second wall and to be contacted by a surface of the tab facing the first wall is provided on an outer surface of the resilient contact piece on the second wall side, and the extending portion is disposed forward of a top of the contact point portion.

According to this configuration, since the extending portion is disposed forward of the top of the contact point portion to be contacted by the surface of the tab facing the first wall, the contact point portion is hardly damaged due to the contact of the contact portion of the extending portion with the side edge of the resilient contact piece. Therefore, the connection reliability of the terminal and the mating terminal is easily ensured.

(4) Preferably, only one of the pair of side walls includes the resilient piece, and the other of the pair of side walls includes a pushing portion for sandwiching the tab in the first direction together with the resilient piece.

According to this configuration, since a movement of the tab in the first direction is suppressed by the resilient piece and the pushing portion, the connection reliability of the terminal and the mating terminal can be ensured also under a vibration environment. Since the resilient piece is provided only in one of the pair of side walls, the tip part of the resilient piece is less likely to move inwardly of the rectangular portion as compared to the case where resilient pieces are provided in both of the pair of side walls.

Details of Embodiments of Present Disclosure

Hereinafter, embodiments of the present disclosure are described. The present disclosure is not limited to these illustrations, but is represented by claims and intended to include all changes in the scope of claims and in the meaning and scope of equivalents.

First Embodiment

A first embodiment of the present disclosure is described with reference to FIGS. 1 to 8. A terminal 10 of this embodiment is, for example, mounted in a vehicle such as an automotive vehicle and used under a vibration environment where vibration is generated. In the following description, a direction indicated by an arrow Z is referred to as an upward direction, a direction indicated by an arrow X is referred to as a forward direction and a direction indicated by an arrow Y is referred to as a leftward direction.

[Terminal]

Figure 5:
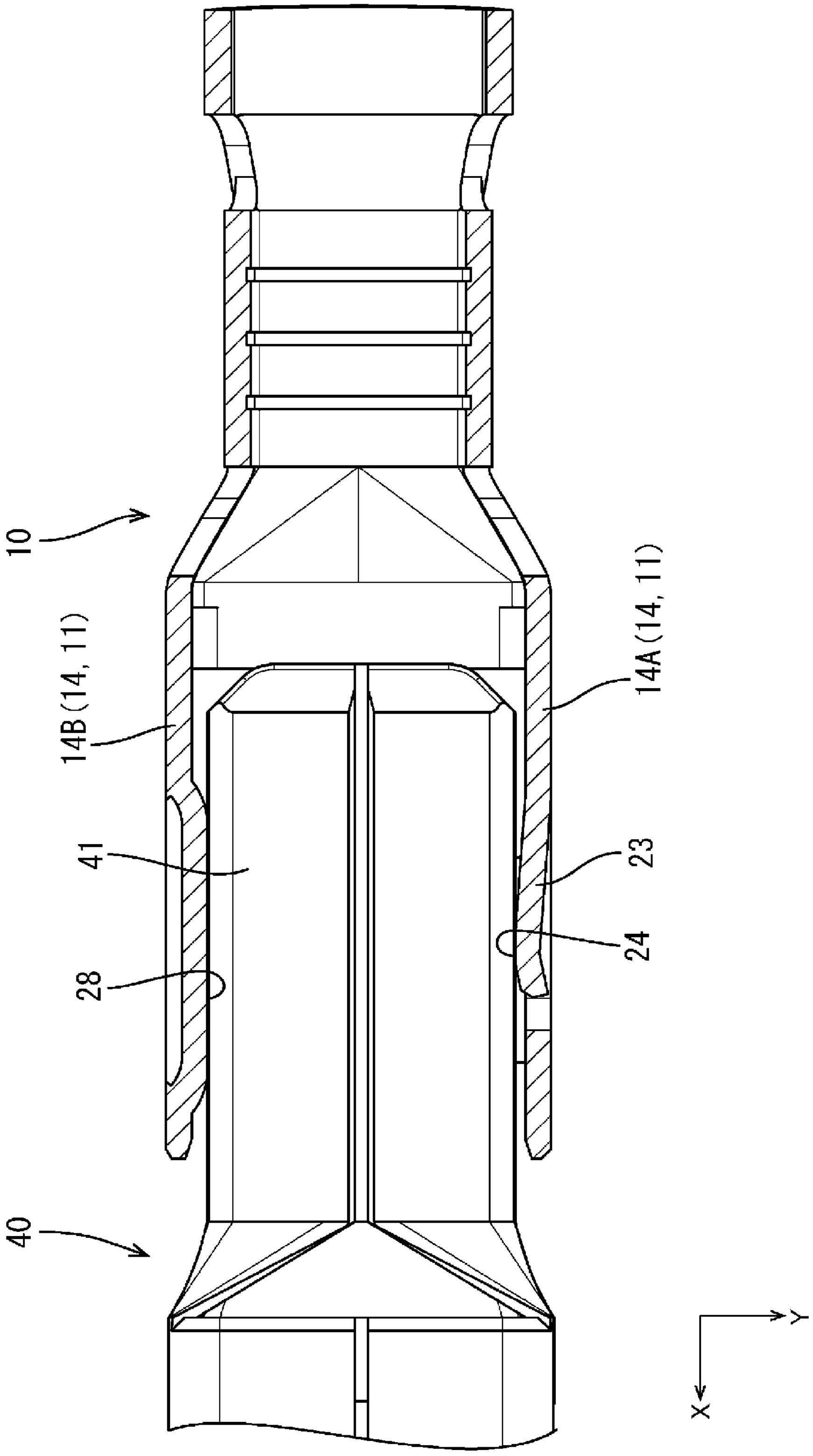
FIG. 5 is a view in cross-section along A-A of FIG. 2 showing a state where a tab of a mating terminal is inserted in a rectangular tube portion.

The terminal 10 is formed by press-working and bending an electrically conductive metal plate material. As shown in FIG. 1, the terminal 10 is provided with a rectangular tube portion 11 open in a front-rear direction in a substantially front half part of the terminal 10 and a wire barrel B1 and an insulation barrel B2 disposed behind the rectangular tube portion 11. As shown in FIG. 5, a tab 41 of a mating terminal 40 is inserted into the rectangular tube portion 11 from front. The wire barrel B1 is crimped to a core wire of an unillustrated coated wire, and the insulation barrel B2 is crimped to an insulation coating of the unillustrated coated wire.

[Rectangular Tube Portion, First Wall, Second Wall, Pair of Side Walls]

Figure 2:
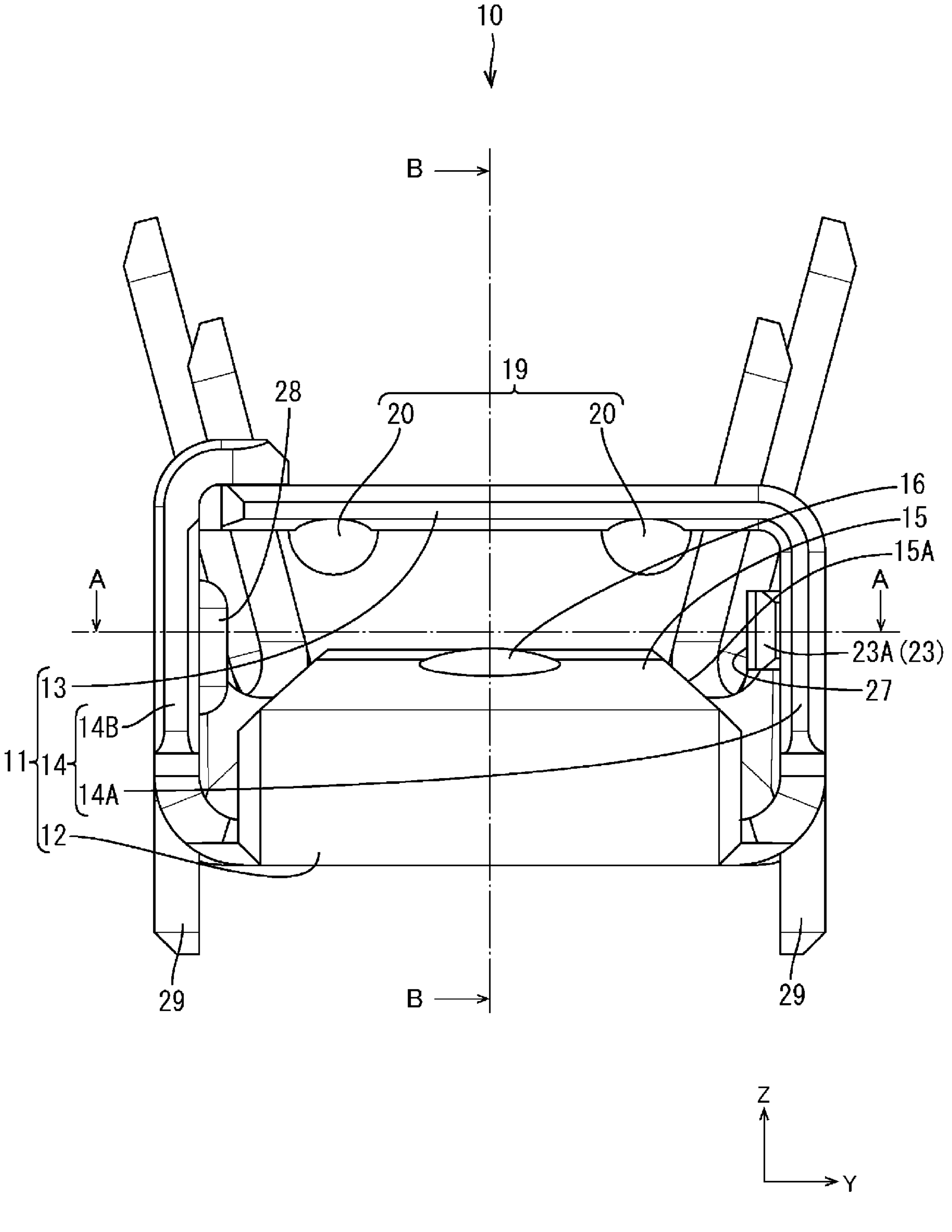
FIG. 2 is a front view of the terminal.
Figure 7:
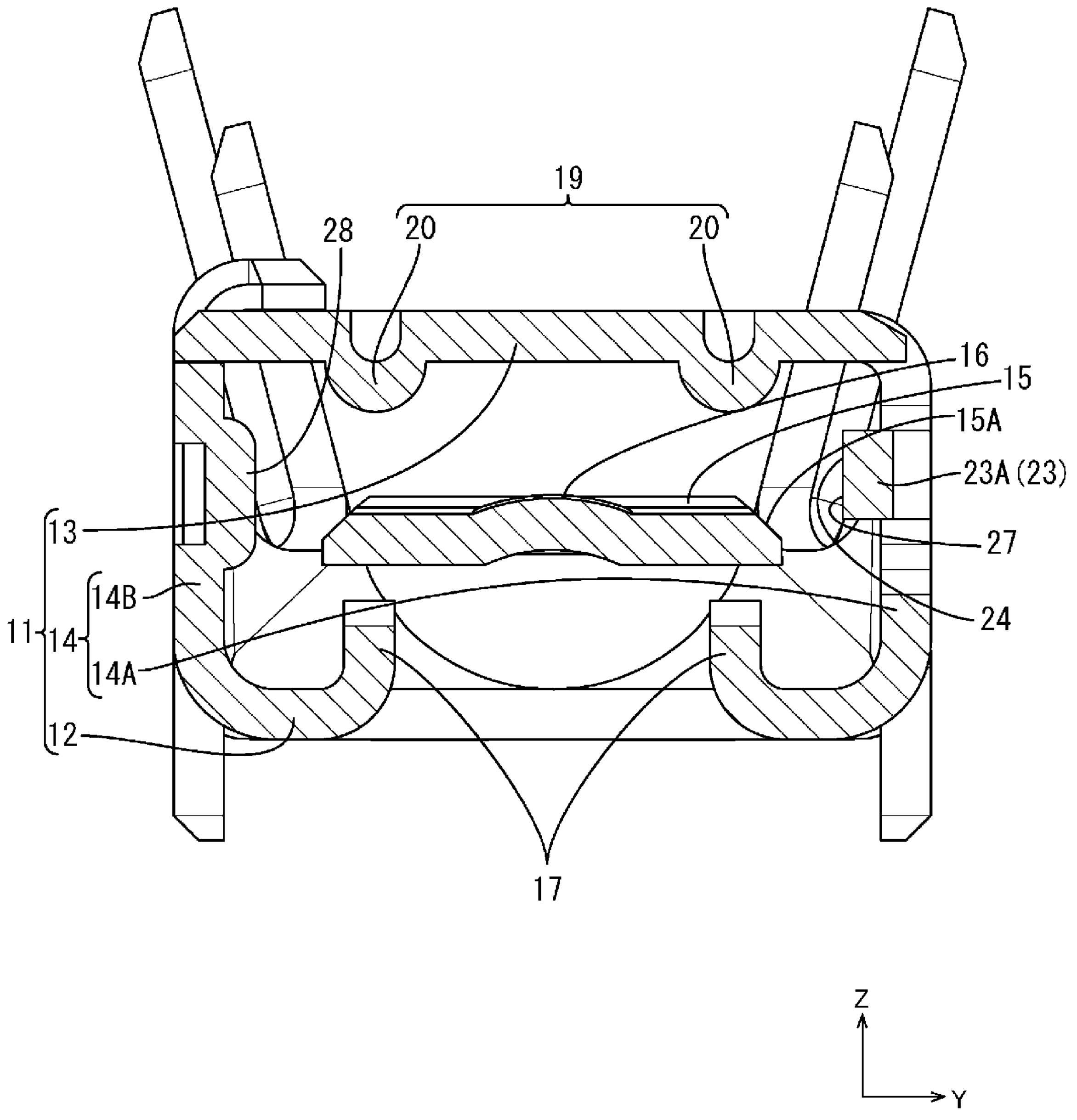
FIG. 7 is a section along C-C of FIG. 3.

As shown in FIGS. 2 and 7, the rectangular tube portion 11 is provided with a first wall 12 disposed on a lower side of the rectangular tube portion 11, a second wall 13 facing the first wall 12 and a pair of side walls 14 connecting both side edges of the first wall 12 and both side edges of the second wall 13. A facing direction of the pair of side walls 14 is a lateral direction (an example of a first direction). One of the pair of side walls 14 is a third wall 14A disposed on a left side of the rectangular tube portion 11. The other side wall 14 is a fourth wall 14B disposed on a right side of the rectangular tube portion 11.

[Resilient Contact Piece, Contact Point Portion]

Figure 6:
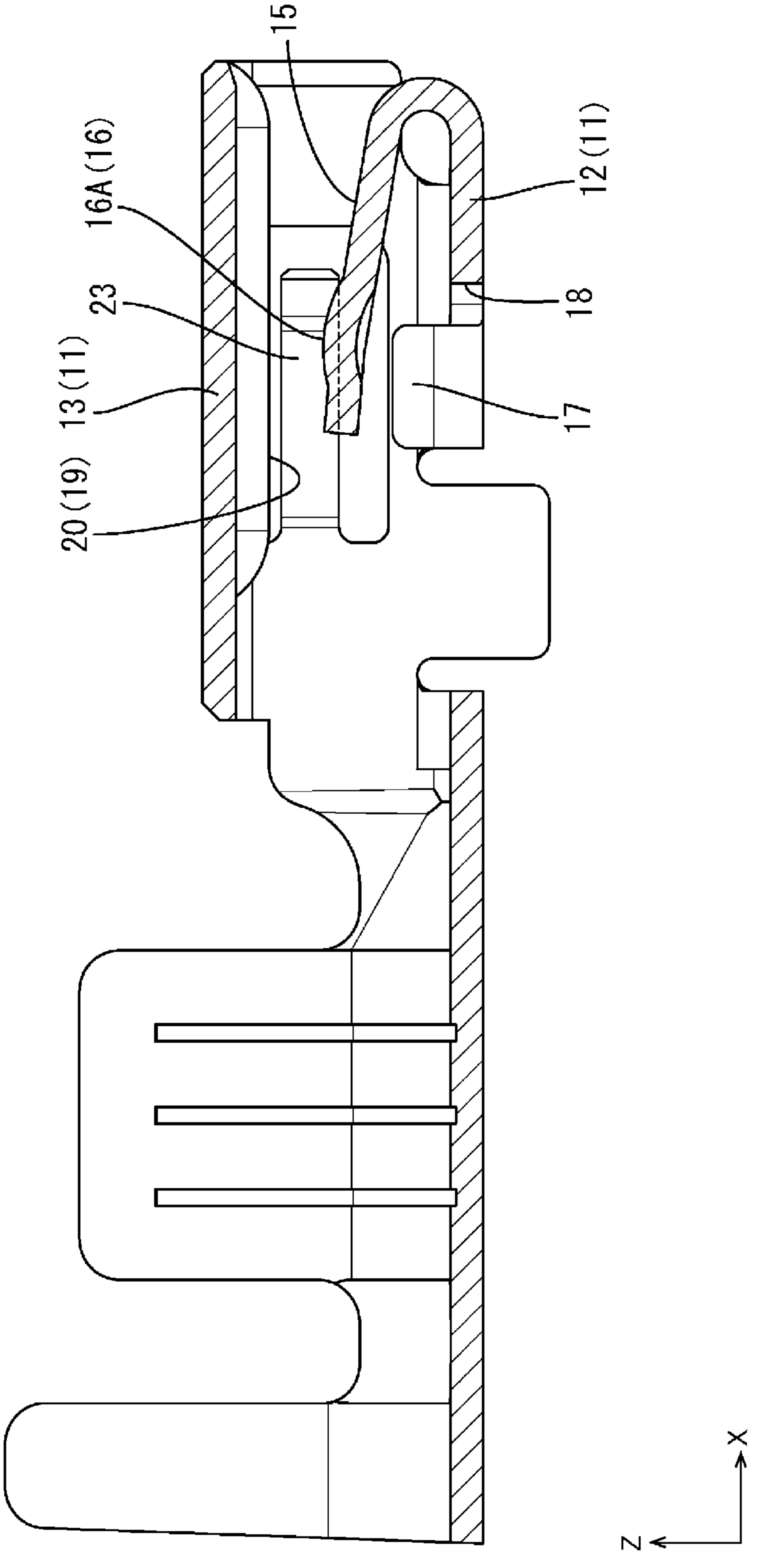
FIG. 6 is a section along B-B of FIG. 2.
Figure 8:
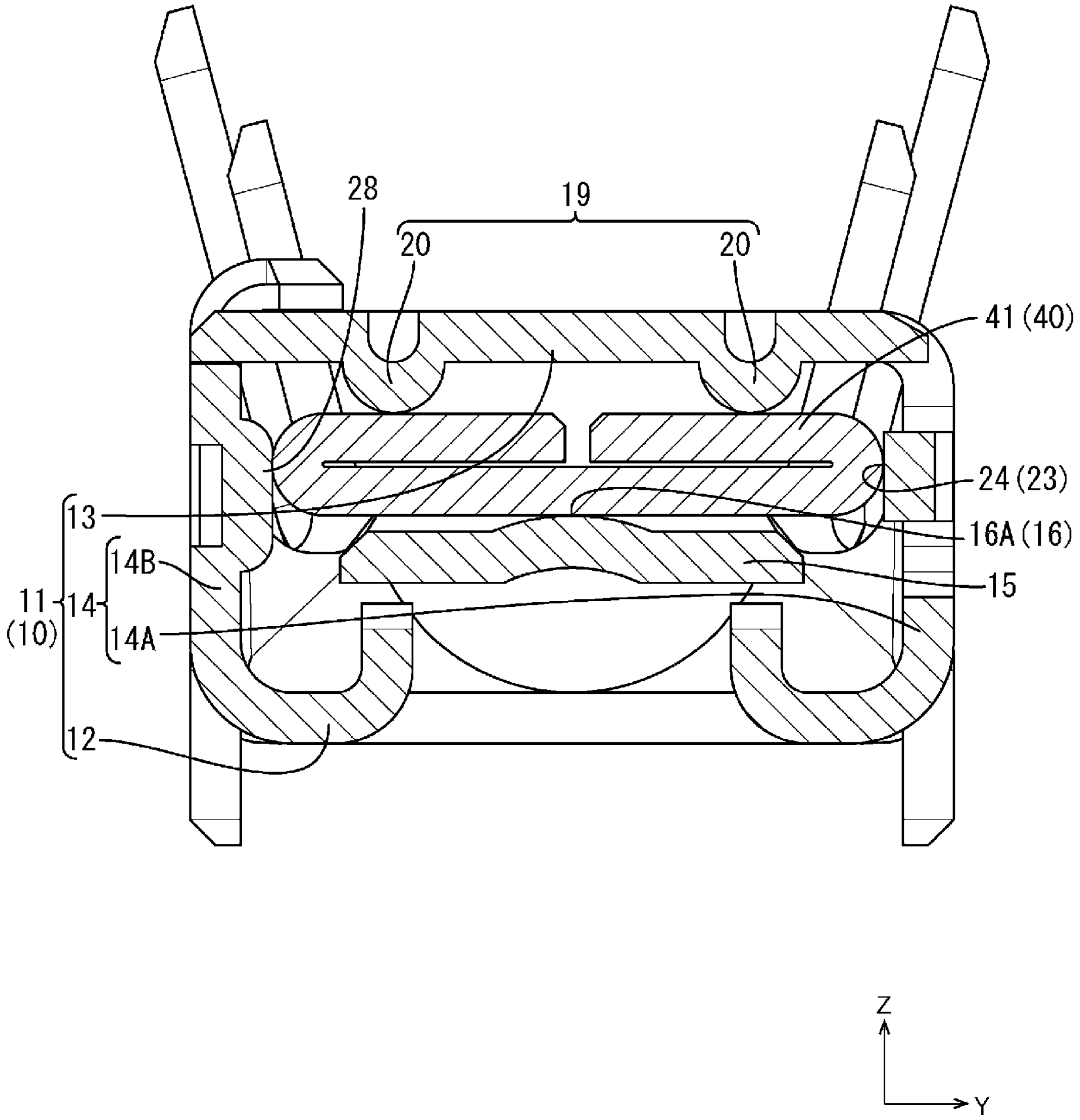
FIG. 8 is a view in cross-section along C-C of FIG. 3 showing the state where the tab of the mating terminal is inserted in the rectangular tube portion.

As shown in FIG. 6, a resilient contact piece 15 folded rearward is provided on the front end of the first wall 12. The resilient contact piece 15 is cantilevered obliquely to an upper rear side in the rectangular tube portion 11 and deflected and deformed downward. A contact point portion 16 projecting upward (toward the second wall 13) is provided on the upper surface (outer surface on the side of the second wall 13) of the resilient contact piece 15. The contact point portion 16 is formed by striking and has a spherical shape as a whole. As shown in FIG. 8, with the tab 41 of the mating terminal 40 inserted in the rectangular tube portion 11, the lower surface (surface facing the first wall 12) of the tab 41 contacts a top 16A of the contact point portion 16. As shown in FIGS. 6 and 8, the top 16A of the contact point portion 16 is disposed at a position, which is a center position in the lateral direction and substantially ⅔ from the front end of the contact point portion 16 in a front-rear direction.

As shown in FIG. 7, excessive deformation preventing portions 17 for suppressing downward deformation of the resilient contact piece 15 are provided below the resilient contact piece 15 of the first wall 12. A pair of the excessive deformation preventing portions 17 are formed by cutting and raising below right and left end parts of the resilient contact piece 15. As shown in FIG. 6, the first wall 12 includes a locking portion 18 for locking the terminal 10 to an unillustrated housing.

[Receiving Portion]

As shown in FIGS. 2 and 7, the second wall 13 is provided with a receiving portion 19 projecting downward from the lower surface of the second wall 13. The receiving portion 19 is formed by being struck downward. The receiving portion 19 is composed of a pair of ridge portions 20 arranged in the lateral direction. As shown in FIG. 6, the ridge portion 20 is formed to extend in the front-rear direction. An interval in the vertical direction between the lower end of the ridge portion 20 and the top 16A of the contact point portion 16 is set to be smaller than a vertical dimension of the tab 41. As shown in FIG. 8, with the tab 41 inserted in the rectangular tube portion 11, the tab 41 is sandwiched in the vertical direction between the receiving portion 19 and the contact point portion 16 of the resilient contact piece 15. In this way, the terminal 10 and the mating terminal 40 are electrically connected.

[Resilient Piece]

Figure 4:
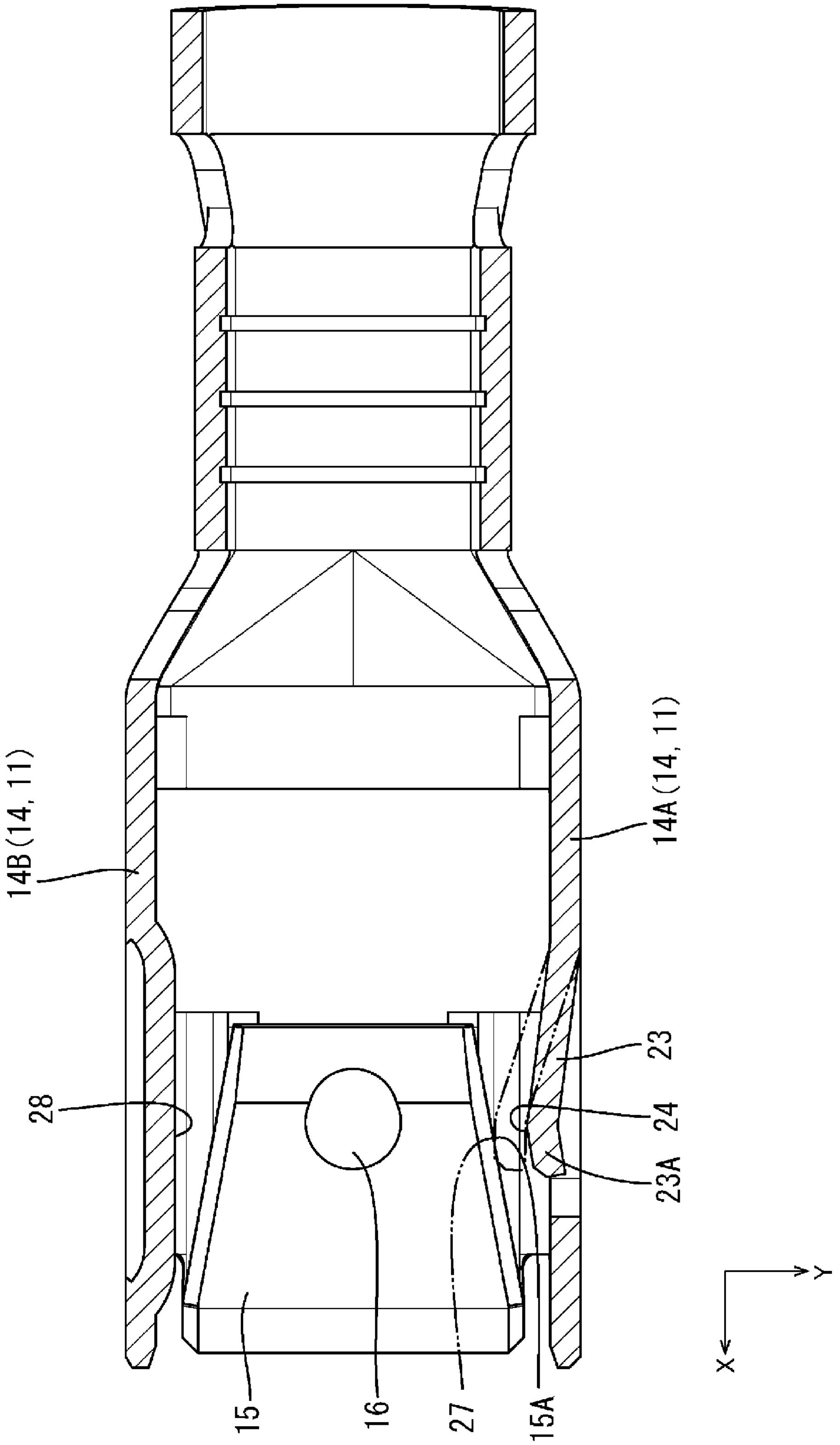
FIG. 4 is a section along A-A of FIG. 2.

As shown in FIG. 1, the third wall 14A is provided with a resilient piece 23 by being cut and raised. The resilient piece 23 is cantilevered forward from a rear part of the third wall 14A. The resilient piece 23 is resiliently deformable in the lateral direction with a base end of a rear end part substantially as a fulcrum. As shown in FIG. 4, the resilient piece 23 is provided to be located more inwardly of the rectangular tube portion 11, i.e. more rightward toward a front side as a whole. A tip part 23A, which is a front end part of the resilient piece 23, is bent outwardly of the rectangular tube portion 11, i.e. leftward. A rightmost part of the resilient piece 23 serves as a pressing portion 24. The pressing portion 24 is disposed at a position near the contact point portion 16 of the resilient contact piece 15 in the front-rear direction. As shown in FIG. 5, the pressing portion 24 presses a side edge of the tab 41 inserted into the rectangular tube portion 11.

[Contact Portion]

Figure 3:
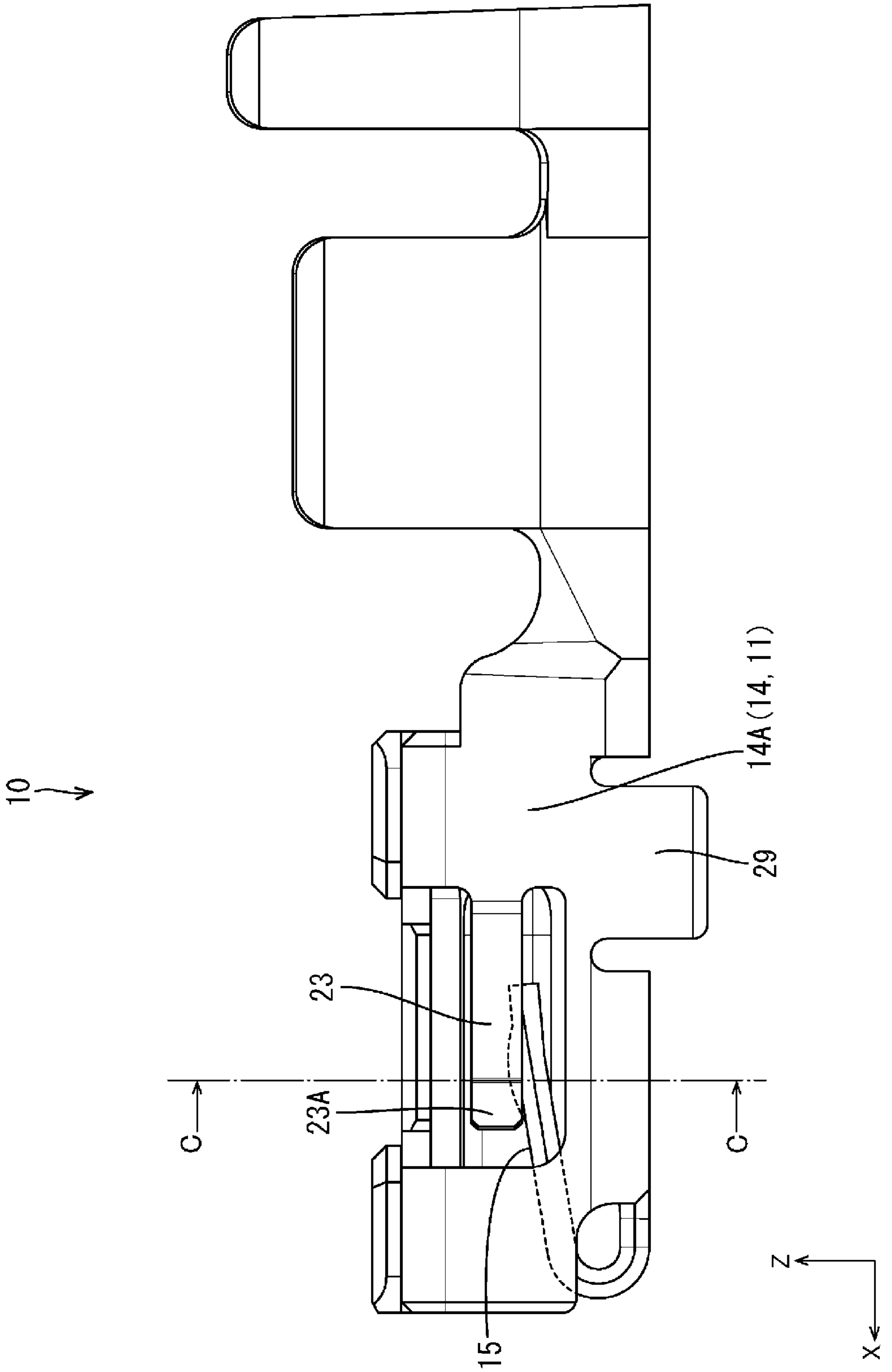
FIG. 3 is a left side view of the terminal.

As shown in FIGS. 3 and 6, a lower part of the resilient piece 23 is provided to overlap an upper part of the resilient contact piece 15 in a side view, and the resilient piece 23 and the resilient contact piece 15 are partially facing each other. That is, as shown in FIGS. 2 and 7, the resilient piece 23 includes a contact portion 27 disposed to face a side edge 15A (left side edge in this embodiment) of the resilient contact piece 15 in the lateral direction. As shown by a two-dot chain line of FIG. 4, if the tip part 23A of the resilient piece 23 is moved rightward by an external force, the contact portion 27 comes into contact with the side edge 15A of the resilient piece 15. The contact portion 27 is disposed on the side of the tip part 23A of the resilient piece 23. Further, the pressing portion 24 may double as the contact portion 27 (see FIG. 7).

[Pushing Portion]

As shown in FIGS. 2, 4 and 7, the fourth wall 14B is provided with a pushing portion 28 projecting leftward from the left surface of the fourth wall 14B. The pushing portion 28 is formed by being struck leftward. The pushing portion 28 is long in the front-rear direction and has a rectangular shape short in the vertical direction. As shown in FIG. 7, the pushing portion 28 and the pressing portion 24 of the resilient piece 23 are disposed at positions between the lower end of the receiving portion 19 and a position somewhat below the upper surface of the resilient contact piece 15 in the vertical direction. An interval in the lateral direction between the pushing portion 28 and the pressing portion 24 is set to be slightly smaller than a lateral dimension of the tab 41.

As shown in FIGS. 5 and 8, with the tab 41 inserted in the rectangular tube portion 11, the tab 41 is sandwiched in the lateral direction between the pushing portion 28 and the pressing portion 24. In this way, a movement of the tab 41 in the lateral direction can be suppressed also under a vibration environment such as an automotive vehicle. Thus, it is possible to suppress the abrasion of the tab 41, the resilient contact piece 15 and the receiving portion 19 due to a movement of the tab 41 in the lateral direction and ensure the connection reliability of the terminal 10 and the mating terminal 40.

As shown in FIGS. 2 and 3, projecting pieces 29 projecting downward of the rectangular tube portion 11 are respectively provided on rear parts of the pair of side walls 14. The projecting pieces 29 prevent the terminal 10 from being inserted in a vertically inverted posture into the housing and guide the insertion of the terminal into the housing by entering grooves provided in the housing when the terminal 10 is accommodated into the unillustrated housing.

[Suppression of Movement of Tip Part of Resilient Piece by Contact Portion]

The terminal 10 according to this embodiment is configured as described above. A movement of the tip part 23A of the resilient piece 23 of the terminal 10 in the lateral direction is described below.

The resilient piece 23 of the terminal 10 is provided by cutting and raising the third wall 14A, and exposed to outside. Thus, there is a possible case where the tip part 23A of the resilient piece 23 moves inwardly of the rectangular tube portion 11 by receiving an external force.

In this embodiment, the tip part 23A of the resilient piece 23 is provided with the contact portion 27, and the contact portion 27 is disposed to face the side edge 15A of the resilient contact piece 15 in the lateral direction. In this way, even if the tip part 23A of the resilient piece 23 moves inwardly of the rectangular tube portion 11 (rightward) by receiving an external force, the contact portion 27 and the side edge 15A of the resilient contact piece 15 come into contact, whereby the tip part 23A of the resilient piece 23 is suppressed from moving inwardly of the rectangular tube portion 11 (rightward) further than the side edge 15A of the resilient contact piece 15. Therefore, it can be, for example, suppressed that the resilient piece 23 rides on the upper surface of the resilient contact piece 15 to hinder the insertion of the tab 41 of the mating terminal 40 into the rectangular tube portion 11.

Functions and Effects of First Embodiment

According to the first embodiment, the following functions and effects are achieved.

The terminal 10 according to the first embodiment is provided with the rectangular portion 11, into which the tab 41 of the mating terminal 40 is inserted from front, the resilient contact piece 15 provided in the rectangular portion 11 and the receiving portion 19 provided in the rectangular portion 11 and configured to sandwich the tab 41 together with the resilient contact piece 15. The rectangular portion 11 includes the first wall 12 provided with the resilient contact piece 15, the second wall 13 provided with the receiving portion 19, and the pair of side walls 14 connecting the both side edges of the first wall 12 and the both side edges of the second wall 13. The facing direction of the pair of side walls 14 is the first direction. At least one of the pair of side walls 14 includes the resilient piece 23 for suppressing a movement of the tab 41 in the first direction by pressing the side edge of the tab 41 inwardly of the rectangular portion 11 in the first direction. The resilient piece 23 includes the contact portion 27 disposed to face the side edge 15A of the resilient contact piece 15 in the first direction. A movement of the tip part 23A of the resilient piece 23 inwardly of the rectangular portion 11 in the first direction is suppressed by the contact of the contact portion 27 and the side edge 15A of the resilient contact piece 15.

According to this configuration, since a movement of the tab 41 in the first direction is suppressed by the resilient piece 23, the abrasion of the tab 41, the resilient contact piece 15 and the receiving portion 19 is suppressed also under a vibration environment and the connection reliability of the terminal 10 and the mating terminal 40 can be ensured. Since a movement of the tip part 23A of the resilient piece 23 inwardly of the rectangular portion 11 in the first direction can be suppressed by the contact of the contact portion 27 of the resilient piece 23 and the side edge 15A of the resilient contact piece 15, the insertion of the mating terminal 40 into the rectangular portion 11 is hardly hindered.

In the first embodiment, only one (third wall 14A) of the pair of side walls 14 is provided with the resilient piece 23, and the other (fourth wall 14B) of the pair of side walls 14 is provided with the pushing portion 28 for sandwiching the tab 41 in the first direction together with the resilient piece 23.

According to this configuration, since a movement of the tab 41 in the first direction is suppressed by the resilient piece 23 and the pushing portion 28, the connection reliability of the terminal 10 and the mating terminal 40 can be ensured also under a vibration environment. Since the resilient piece 23 is provided in only one (third wall 14A) of the pair of side walls 14, the tip part 23A of the resilient piece is less likely to move inwardly of the rectangular portion 11 as compared to the case where resilient pieces are provided in both of a pair of side walls.

Second Embodiment

A second embodiment of the present disclosure is described with reference to FIGS. 9 to 12. A terminal 110 of the second embodiment is configured similarly to the terminal 10 of the first embodiment except the configuration of a resilient piece 123. The same members as in the first embodiment are denoted by reference signs used in the first embodiment and the same configurations, functions and effects as in the first embodiment are not described below.

[Body Portion, Extending Portion]

Figure 10:
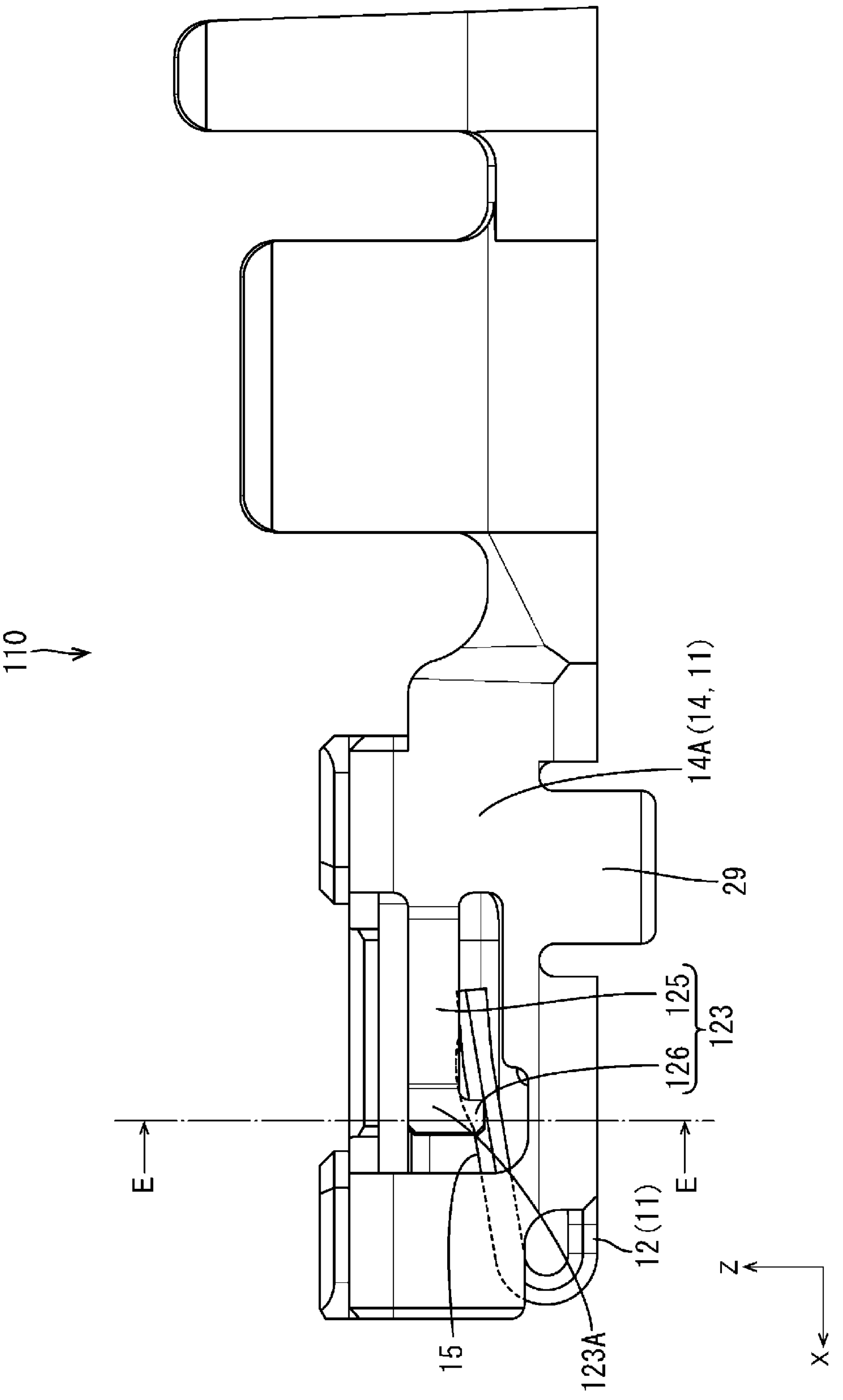
FIG. 10 is a left side view of the terminal.

As shown in FIG. 10, the resilient piece 123 is substantially L-shaped in a side view and includes a body portion 125 long in the front-rear direction and an extending portion 126 extending toward a first wall 12 (i.e. downward) from a tip part of the body portion 125. The extending portion 126 is a lower part of a tip part 123A of the resilient piece 123.

[Contact Portion]

Figure 9:
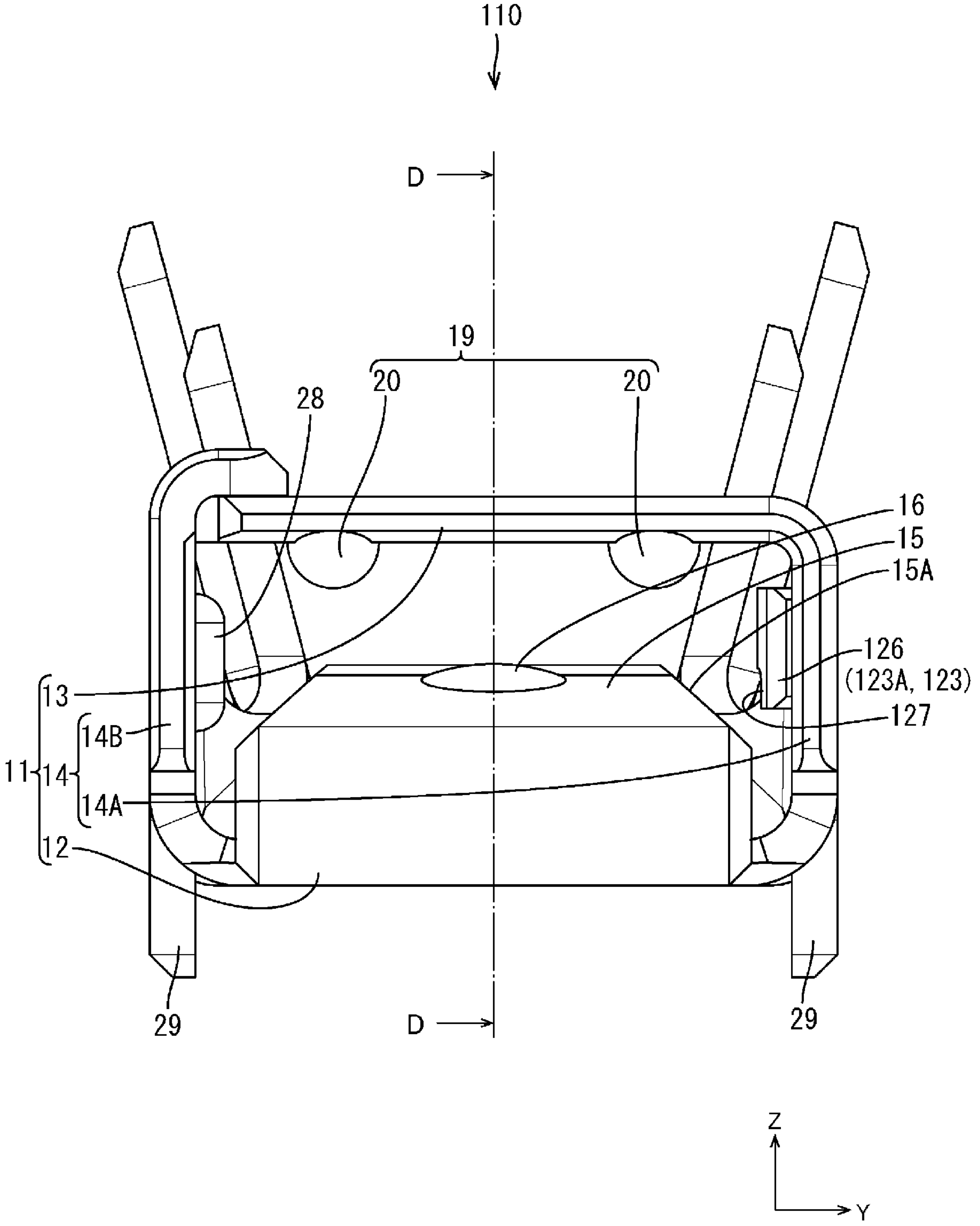
FIG. 9 is a front view of a terminal according to a second embodiment.
Figure 12:
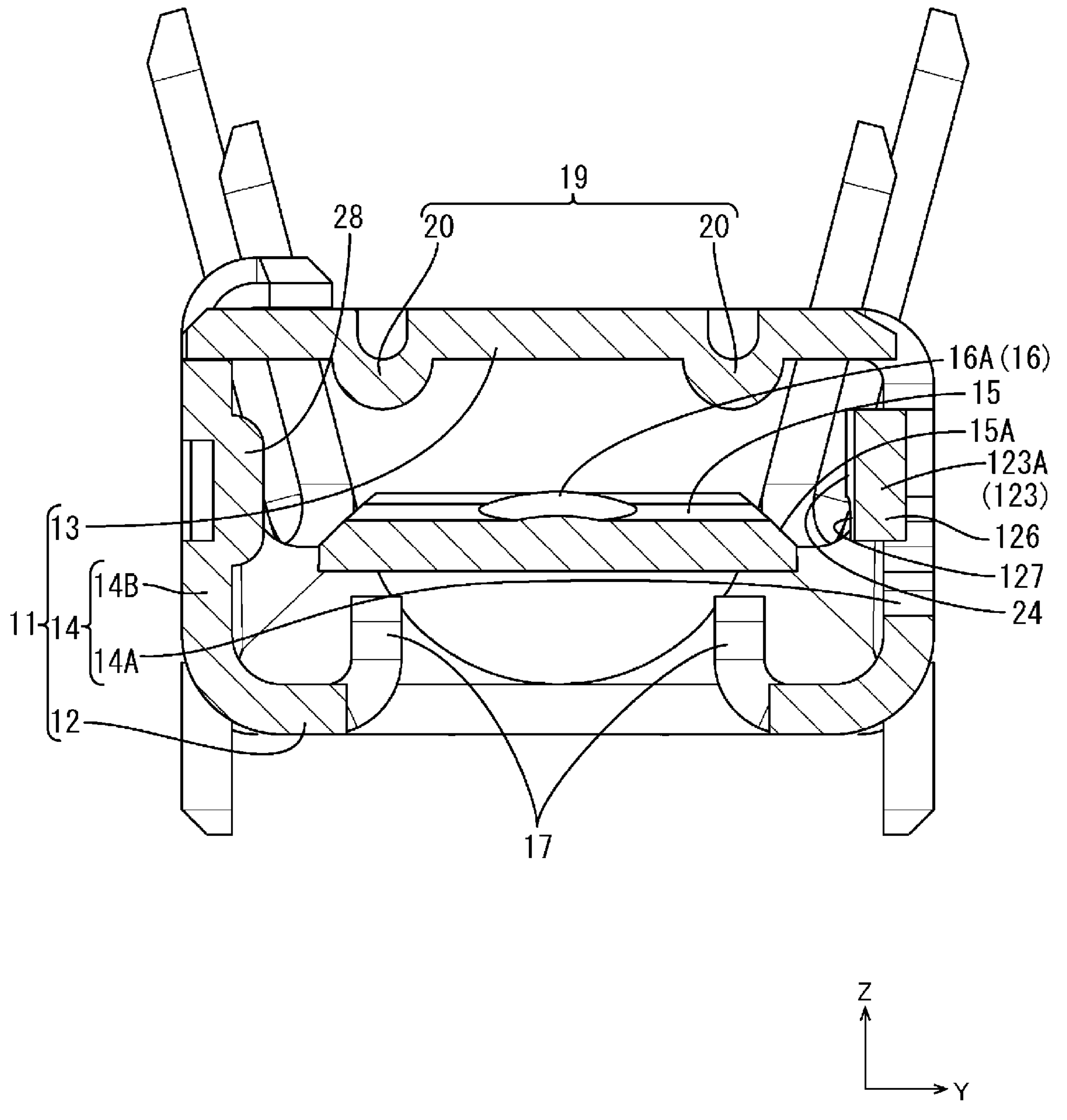
FIG. 12 is a section along E-E of FIG. 10.

As shown in FIGS. 9 and 12, the extending portion 126 includes a contact portion 127 disposed to face a side edge 15A (left side edge in this embodiment) of a resilient contact piece 15 in the lateral direction. If the tip part 123A of the resilient piece 123 is moved inwardly of a rectangular portion 11 (rightward) by an external force, the contact portion 127 and the side edge 15A of the resilient contact piece 15 come into contact, whereby the tip part 123A of the resilient piece 123 is suppressed from moving further rightward than the side edge 15A of the resilient piece 15. Therefore, it can be, for example, suppressed that the resilient piece 123 rides on the upper surface of the resilient contact piece 15 to hinder the insertion of a tab 41 of a mating terminal 40 into the rectangular tube portion 11.

In this embodiment, a contact part of the side edge 15A of the resilient contact piece 15 and the contact portion 127 is enlarged by providing the extending portion 126. On the other hand, if the resilient piece 23 includes no extending portion, for example, as in the first embodiment, it is difficult to enlarge a contact part of the contact portion 27 and the side edge 15A of the resilient contact piece 15 without changing a vertical dimension of the resilient piece 23 (see FIGS. 2 and 7).

Figure 11:
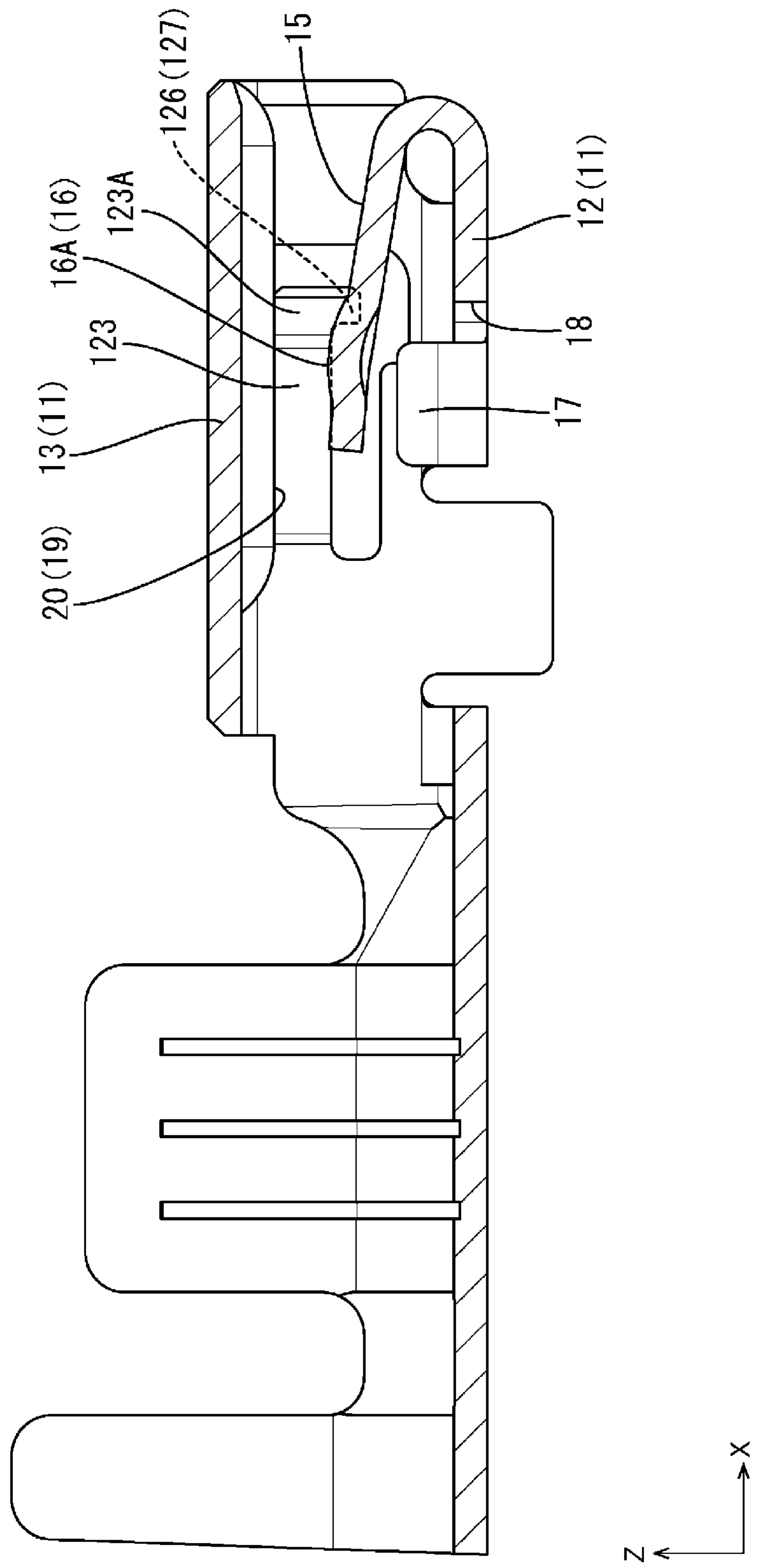
FIG. 11 is a section along D-D of FIG. 9.

As shown in FIG. 11, the extending portion 126 is preferably disposed forward of (closer to the base end of the resilient contact piece 15) than a top 16A of a contact point portion 16. In this way, even if the tip part 123A of the resilient piece 123 moves inwardly of the rectangular portion 11, the contact point portion 16 is hardly damaged since the contact portion 127 of the extending portion 126 comes into contact with the side edge 15A of the resilient contact piece 15 at a position forward of the top 16A of the contact point portion 16 (see FIG. 12). Specifically, the position of the top 16A of the contact point portion 16 hardly changes and the spherical outer surface of the contact point portion 16 is hardly damaged. Since the top 16A of the contact point portion 16 is a part to be contacted by the lower surface of the tab 41 and associated with the connection of the terminal 110 and the mating terminal 40, the connection reliability of the terminal 110 and the mating terminal 40 is easily ensured according to this embodiment.

Functions and Effects of Second Embodiment

According to the second embodiment, the following functions and effects are achieved.

In the second embodiment, the resilient piece 123 includes the body portion 125 long in the front-rear direction and the extending portion 126 extending toward the first wall 12 from the tip part of the body portion 125, and the extending portion 126 includes the contact portion 127.

According to this configuration, the contact part of the contact portion 127 and the side edge 15A of the resilient contact piece 15 is easily enlarged. Thus, a movement of the tip part 123A of the resilient piece 123 inwardly of the rectangular portion 11 can be further suppressed.

In the second embodiment, the contact point portion 16 having a spherical shape, projecting toward a second wall 13 and to be contacted by the surface (lower surface) of the tab 41 facing the first wall 12 is provided on the outer surface (upper surface) of the resilient contact piece 15 on the side of the second wall 13, and the extending portion 126 is disposed forward of the top 16A of the contact point portion 16.

According to this configuration, since the extending portion 126 is disposed forward of the top 16A of the contact point portion 16 to be contacted by the surface (lower surface) of the tab 41 facing the first wall 12, the contact point portion 16 is hardly damaged due to the contact of the contact portion 127 of the extending portion 126 with the side edge 15A of the resilient contact piece 15. Therefore, the connection reliability of the terminal 110 and the mating terminal 40 is easily ensured.

Other Embodiments (1) Although the resilient piece 23, 123 is provided only in the third wall 14A and the pushing portion 28 provided on the fourth wall 14B in the above embodiments, there is no limitation to this and a resilient piece may be provided in each of a pair of side walls and a tab may be sandwiched in the first direction by a pair of the resilient pieces.

(2) Although the resilient piece 23, 123 is cantilevered forward from the rear part of the third wall 14A in the above embodiments, there is no limitation to this. For example, a resilient piece may be cantilevered rearward from a front part of a third wall.

LIST OF REFERENCE NUMERALS

10, 110: terminal
11: rectangular tube portion
12: first wall
13: second wall
14: side wall
14A: third wall
14B: fourth wall
15: resilient contact piece
15A: side edge
16: contact point portion
16A: top
17: excessive deflection preventing portion
18: locking portion
19: receiving portion
20: ridge portion
23, 123: resilient piece
23A, 123A: tip part
24: pressing portion
27, 127: contact portion
28: pushing portion
29: projecting piece
40: mating terminal
41: tab
125: body portion
126: extending portion
B1: wire barrel
B2: insulation barrel

What is claimed is:

1. A terminal, comprising:

a rectangular tube portion, a tab of a mating terminal being inserted into the rectangular tube portion from front;

a resilient contact piece provided in the rectangular tube portion; and a receiving portion provided in the rectangular tube portion, the receiving portion sandwiching the tab together with the resilient contact piece, the rectangular tube portion including a first wall provided with the resilient contact piece, a second wall provided with the receiving portion and a pair of side walls connecting both side edges of the first wall and both side edges of the second wall, a facing direction of the pair of side walls being a first direction, at least one of the pair of side walls including a resilient piece for suppressing a movement of the tab in the first direction by pressing a side edge of the tab inwardly of the recontact portion in the first direction, the resilient piece including a contact portion disposed to face a side edge of the resilient contact piece in the first direction, a movement of a tip part of the resilient piece inwardly of the rectangular tube portion in the first direction being suppressed by contact of the contact portion with the side edge of the resilient contact piece, the resilient piece including a body portion long in a front-rear direction and an extending portion extending toward the first wall from a tip part of the body portion, and the extending portion including the contact portion.

2. The terminal of claim 1, wherein:

a contact point portion having a spherical shape, projecting toward the second wall and to be contacted by a surface of the tab facing the first wall is provided on an outer surface of the resilient contact piece on the second wall side, and the extending portion is disposed forward of a top of the contact point portion.

3. The terminal of claim 1, wherein:

only one of the pair of side walls includes the resilient piece, and the other of the pair of side walls includes a pushing portion for sandwiching the tab in the first direction together with the resilient piece.

* * * * *